United States Patent
Kotik

(10) Patent No.: US 10,109,831 B2
(45) Date of Patent: Oct. 23, 2018

(54) PRESSURE RELIEF DEVICE

(71) Applicant: Robert Bosch Battery Systems, LLC, Orion, MI (US)

(72) Inventor: Mark M. Kotik, Rochester Hills, MI (US)

(73) Assignees: Robert Bosch Battery Systems, LLC, Orion, MI (US); Robert Bosch GmbH, Stuttgart (DE)

( * ) Notice: Subject to any disclaimer, the term of this patent is extended or adjusted under 35 U.S.C. 154(b) by 821 days.

(21) Appl. No.: 14/021,156

(22) Filed: Sep. 9, 2013

(65) Prior Publication Data
US 2014/0087216 A1    Mar. 27, 2014

Related U.S. Application Data

(60) Provisional application No. 61/705,865, filed on Sep. 26, 2012.

(51) Int. Cl.
    *H01M 2/12*      (2006.01)
    *H01M 2/10*      (2006.01)

(52) U.S. Cl.
    CPC ....... *H01M 2/1235* (2013.01); *H01M 2/1072* (2013.01); *H01M 2/12* (2013.01); *H01M 2/1223* (2013.01)

(58) Field of Classification Search
    CPC .... H01M 2/12; H01M 2/1235; H01M 2/1072; H01M 2/1223
See application file for complete search history.

(56) References Cited

U.S. PATENT DOCUMENTS

| | | | | |
|---|---|---|---|---|
| 5,536,590 A | * | 7/1996 | Cheiky | G06F 1/1632 429/123 |
| 2003/0175582 A1 | * | 9/2003 | Phillips | H01M 2/1294 429/53 |
| 2007/0148533 A1 | * | 6/2007 | Anglin | H01M 2/1241 429/56 |
| 2010/0032039 A1 | * | 2/2010 | Nemoto | H01M 2/1229 137/843 |

(Continued)

FOREIGN PATENT DOCUMENTS

| EP | 2131416 A1 | 12/2009 |
|---|---|---|
| JP | S61143937 A | 7/1986 |

(Continued)

OTHER PUBLICATIONS

Takashi, Organic Electrolyte Cell, JP01311558, Dec. 15, 1989.*

(Continued)

*Primary Examiner* — Alexander Usyatinsky
(74) *Attorney, Agent, or Firm* — Maginot Moore & Beck LLP

(57) ABSTRACT

A pressure relief device attached to an outer surface of a battery pack includes an adhesive arranged around an opening in the outer surface of the battery pack and a hat portion arranged over the opening. The hat portion includes an outer ring portion attached to the outer surface of the battery pack via the adhesive and an inner portion that is recessed from the outer surface of the battery pack to form a gap between the opening and the inner portion. A diameter of the inner portion is greater than a diameter of the opening, and a diameter of the gap is greater than the diameter of the opening.

18 Claims, 3 Drawing Sheets

(56) References Cited

U.S. PATENT DOCUMENTS

2010/0233250 A1     9/2010   Baras et al.
2011/0045325 A1*    2/2011   Anzai ................. H01M 2/1205
                                                                      429/53

FOREIGN PATENT DOCUMENTS

JP          H01311558 A     12/1989
JP          2003187760 A     7/2003
JP          2009043586 A     2/2009

OTHER PUBLICATIONS

Kiryu et al., Square type battery, JPH06163012, Jun. 10, 1994.*
JP H01_311558A_translation.*
BS&B Safety Systems, Product List: Rupture Disks (Bursting Discs), available at http://www.bsbsystems.com/Rupture_Disks/rupture_disks.html, printed on Nov. 25, 2013 (3 pages).
Wehberg Safety GmbH, Product List, available at http://www.wehberg-safety.net/index.php?module=viewer&index[viewer][page]=products, printed on Nov. 25, 2013 (2 pages).
International Search Report and Written Opinion corresponding to PCT Application No. PCT/US2013/058853, dated Jan. 15, 2014 (11 pages).

* cited by examiner

PRESSURE RELIEF DEVICE

CROSS-REFERENCE TO RELATED APPLICATIONS

This application claims the benefit of U.S. Provisional Application No. 61/705,865, filed on Sep. 26, 2012. The entire disclosure of the above application is incorporated herein by reference.

FIELD

The present disclosure relates to a pressure relief device for a battery pack of an electric vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Battery systems may be used to provide power in a wide variety of applications. Exemplary transportation applications include hybrid electric vehicles (HEV), plug-in HEVs, electric vehicles (EV), heavy duty vehicles (HDV), and vehicles with 42-volt electrical systems. Exemplary stationary applications include backup power for telecommunications systems, uninterruptible power supplies (UPS), and distributed power generation applications.

Examples of the types of batteries that are used include nickel metal hydride (NiMH) batteries, lead-acid batteries, lithium batteries, lithium-ion batteries, and other types of batteries. A battery system may include a plurality of battery subpacks that are connected in series and/or in parallel. The battery subpacks may include a plurality of batteries that are connected in parallel and/or in series.

SUMMARY

A pressure relief device attached to an outer surface of a battery pack includes an adhesive arranged around an opening in the outer surface of the battery pack and a hat portion arranged over the opening. The hat portion includes an outer ring portion attached to the outer surface of the battery pack via the adhesive and an inner portion that is recessed from the outer surface of the battery pack to form a gap between the opening and the inner portion. A diameter of the inner portion is greater than a diameter of the opening, and a diameter of the gap is greater than the diameter of the opening.

A battery pack includes an opening in an outer surface of the battery pack and a pressure relief device attached to the outer surface of a battery pack. The pressure relief device includes an adhesive arranged around the opening, an outer ring portion attached to the outer surface of the battery pack via the adhesive, and an inner portion that is recessed from the outer surface of the battery pack to form a gap between the opening and the inner portion. A diameter of the inner portion is greater than a diameter of the opening, and a diameter of the gap is greater than the diameter of the opening.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An electric vehicle is powered by a battery (i.e., a battery pack or system that includes a plurality of batteries or subpacks) that may contain one or more gases under pressure. For example, the gases may be contained in one or more sealed enclosures such as the batteries in the battery pack. In rare circumstances, a failure of one or more of the sealed enclosures releases the gases into the battery pack. As a result, a pressure within the battery pack increases and the gases may escape from the battery pack.

A battery pack according to the principles of the present disclosure includes a pressure relief device. In the event of a failure of the sealed enclosures, the pressure relief device releases high pressure gases from the battery pack in a controlled and directed manner. The pressure relief device includes a hat portion arranged over an opening in an enclosure (i.e., the battery pack). The hat portion is attached to the enclosure using an adhesive. A size of the opening corresponds to a desired exhaust flow rate of gases from the battery pack through the opening. A size of the hat portion and/or distribution of the adhesive correspond to a desired burst pressure of the pressure relief device.

Figure 1:
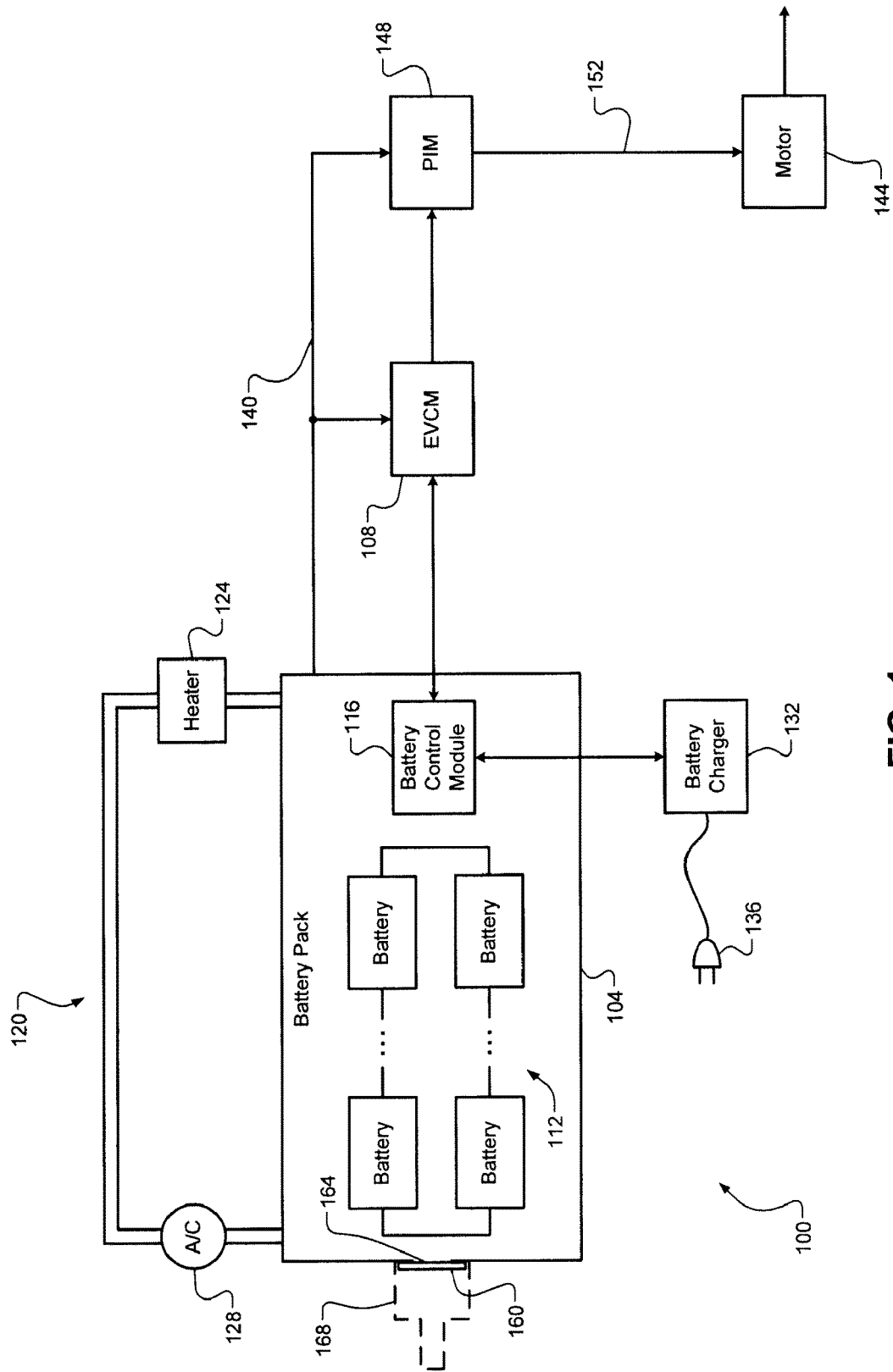
FIG. 1 is a functional block diagram of an electric vehicle according to the principles of the present disclosure.

Referring now to FIG. 1, an electric vehicle 100 includes a battery pack 104 and an electric vehicle control module (EVCM) 108. The battery pack 104 includes a plurality of batteries 112 and a battery control module 116. The battery control module 116 controls various functions of the battery pack 104 and monitors and collects various characteristics of the battery pack 104. For example, the battery control module 116 monitors characteristics including, but not limited to, voltage, current, and temperature associated with the battery pack 104. The battery control module 116 may determine performance variables of the battery pack 104 based on the characteristics. For example only, the battery control module 116 may estimate a state of charge (SOC) of the battery pack 104 based on the voltage, current, and temperature of the battery pack 104. The battery control module 116 may also determine an age of the battery pack 104 (e.g., ages of the batteries 112), and beginning of life (BOL) and/or end of life (EOL) information (and battery performance limitations associated with the BOL and/or EOL information) based on the age.

The battery control module 116 may initiate heating and/or cooling of the battery pack 104 based on the temperature. For example, a coolant system 120 may provide liquid coolant that flows through the battery pack 104 to heat and cool the battery pack 104. The coolant system 120 may include a heater 124 that heats the coolant when the temperature of the battery pack 104 is less than a low temperature threshold, and an air conditioner/compressor 128 that cools the coolant when the temperature of the battery pack 104 is greater than a high temperature threshold. Alternatively, instead of a compressor, the coolant system 120 may include any other coolant device suitable to chill the coolant, such as a thermoelectric cooler.

The battery control module 116 may communicate with a battery charger 132 (e.g., a battery charger of an electric or plug-in hybrid vehicle). The battery charger 132 charges the battery pack 104 and may include a user interface (not shown) for providing visual indications (e.g., via a display) of the condition of the battery pack 104 (e.g., the SOC of the battery pack 104). The battery charger 132 includes a plug 136 that interfaces with a power source (not shown) to provide charging power to the battery pack 104 via the battery charger 132.

The EVCM 108 communicates with the battery pack 104 and the battery control module 116 to control various functions of the vehicle 100. For example, the EVCM 108 receives voltage 140 from the battery pack 104. Conversely, the EVCM 108 receives information from the battery control module 116 related to, for example only, the monitored characteristics of the battery pack 104 and functions of the battery control module 116, the coolant system 120, and the battery charger 132.

The EVCM 108 controls a motor 144 of the vehicle 100 via a power inverter module (PIM) 148. The PIM 148 converts direct current (DC) voltage (e.g., the voltage 140) to alternating current (AC) voltage 152 and provides the AC voltage 152 to the motor 144. The motor 144 provides rotational force to drive wheels (not shown) of the vehicle 100. Alternatively, the motor 144 may be implemented as a DC motor, and the PIM 148 may be replaced by a motor controller that provides a DC voltage to the motor 144.

A pressure relief device 160 is arranged over an opening 164 in the battery pack 104. The opening 164 is sized according to a desired flow rate of gases exiting the battery pack 104 through the opening 164. For example only, the size of the opening 164 corresponds to a desired flow rate when a pressure of the gases within the battery pack 104 is sufficient to cause the pressure relief device 160 to burst (i.e., a burst pressure). The opening 164 may be circular and have a diameter corresponding to the desired flow rate at the burst pressure.

The pressure relief device 160 is attached to the battery pack 104 over the opening 164 using an adhesive (not shown). For example, the adhesive includes a removable adhesive, such as a pressure sensitive adhesive. In other words, the adhesive adheres the pressure relief device 160 to the battery pack 104 when a pressure within the battery pack 104 is less than a threshold. Conversely, the adhesive releases the pressure relief device 160 from the battery pack 104, allowing the gases to vent, when the pressure within the battery pack 104 is greater than or equal to the threshold.

While sufficient pressure from within the battery pack 104 causes the pressure relief device 160 to burst outward from the battery pack 104, pressure from outside of the battery pack 104 (i.e., reverse pressure) does not cause the pressure relief device 160 to burst (e.g., inward). In other words, the pressure relief device 160 provides venting in only one direction (i.e., in a direction out of the battery pack 104). For example only, the pressure relief device 160 is comprised of rigid plastic, metal, or another suitable material. Accordingly, the pressure relief device 160 is resistant to external damage and/or pressure.

When the pressure relief device 160 bursts, the gases within the battery pack 104 vent outward through the opening 164. For example only, the gases may vent directly from the battery pack 104 to atmosphere (i.e., to an exterior of the vehicle 100) if the opening 164 is located adjacent to the exterior of the vehicle 100. Alternatively, if the opening 164 is not located adjacent to the exterior of the vehicle 100, the gases may vent through an exhaust pipe 168 to the exterior of the vehicle 100.

Figure 3:
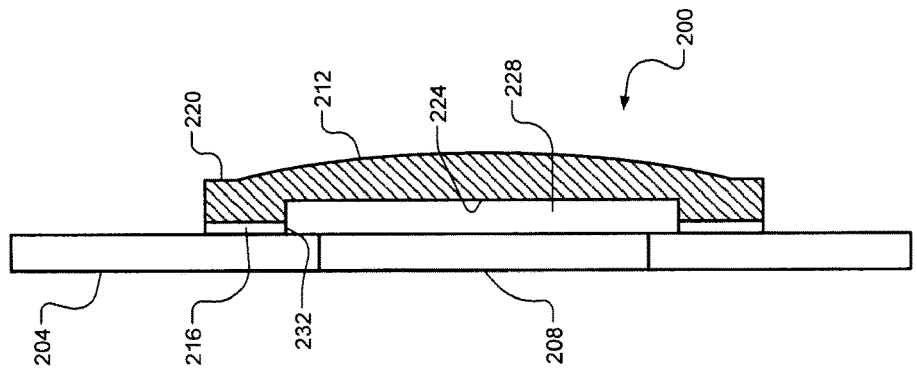
FIGS. 2A, 2B, and 3 illustrate an example pressure relief device according to the principles of the present disclosure.
Figure 2A:
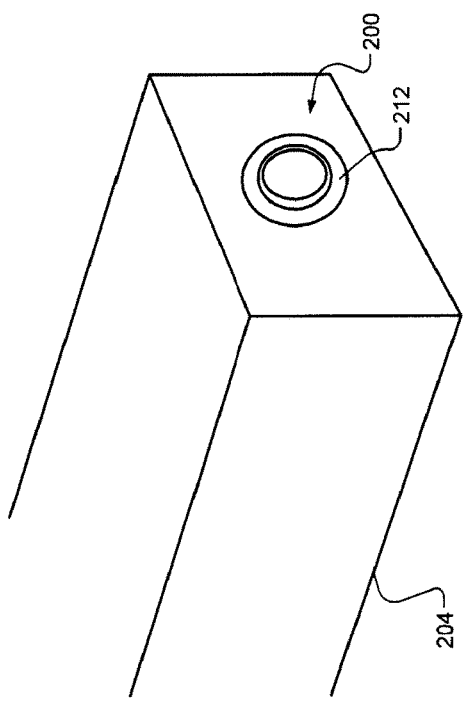
Figure 2B:
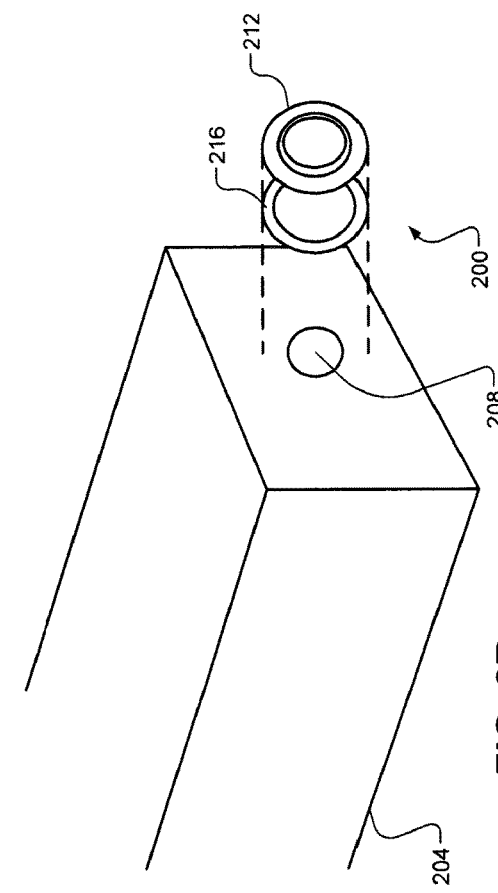

Referring now to FIGS. 2A, 2B, and 3, an example pressure relief device 200 is arranged on a sealed enclosure such as a battery pack 204. The pressure relief device 200 is arranged over an opening 208 in the battery pack 204. When pressure within the battery pack 204 (e.g., due to an accumulation of gases) is greater than or equal to a threshold, the pressure relief device 200 bursts. For example only, the pressure relief device 200 becomes detached from the battery pack 204, allowing the gases to vent outward through the opening 208. The pressure relief device 200 includes a hat portion 212 that is attached to the battery pack 204 using a removable adhesive 216.

As shown in FIG. 3 in cross-section, the hat portion 212 may include an outer ring portion 220 and a recessed inner portion 224 arranged over the opening 208. The inner portion 224 may be concave or otherwise spaced apart from the opening 208. For example, the outer ring portion 220 is in direct contact with the adhesive 216 and, via the adhesive 216, indirect contact with the battery pack 204. Conversely, the inner portion 224 is recessed with respect to the opening 208 and therefore spaced apart from the opening 208 to form a gap 228 between the battery pack 204 and the inner portion 224.

A diameter of the inner portion 224 (and therefore the gap 228) is greater than a diameter of the opening 208. In particular, the diameter of the inner portion 224 is determined based on a desired burst pressure of the pressure relief device 200. For example, as the diameter of the inner portion 224 increases, the burst pressure of the pressure relief device 200 decreases (i.e., the burst pressure is inversely proportional to the diameter of the inner portion 224). The diameter of the inner portion 224 determines an area of the pressure relief device 200 that is exposed to the gases venting through the opening 208. In other words, as the diameter of the inner portion 224 (and therefore the exposed area of the pressure relief device 200) increases, a greater amount of the venting gases contact the interior of the pressure relief device 200. Accordingly, a smaller amount of pressure and corresponding flow rate of the gases through the opening 208 will cause the pressure relief device 200 to burst.

Conversely, as the diameter of the inner portion 224 decreases, a smaller amount of the venting gases contact the interior of the pressure relief device 200, and a greater amount of pressure and corresponding flow rate of the gases are required to cause the pressure relief device 200 to burst. In other words, the diameter of the inner portion 224 and the gap 228, rather than the diameter of the opening 208, determines the burst pressure, while the diameter of the opening 208 determines the expected gas flow rate at the desired burst pressure.

Accordingly, the burst pressure of the pressure relief device 200 can be controlled by varying certain parameters of the pressure relief device 200. More specifically, the burst pressure can be controlled without changing the size of the opening 208 by varying the exposed inner portion of the pressure relief device 200. For example, the burst pressure is decreased by increasing the diameter of the inner portion 224 and the gap 228 (and therefore increasing the area of the interior of the pressure relief device exposed to the venting gases) relative to the diameter of the opening 208. Conversely, the burst pressure is increased by decreasing the diameter of the inner portion 224 and the gap 228 relative to the diameter of the opening 208.

Those skilled in the art can also appreciate that, although a circular pressure relief device 200 is shown, the pressure relief device 200 may be other suitable shapes while still implementing the principles of the present disclosure. However, when the inner portion 224 and the gap 228 are circular, a ratio of an inner surface area of the hat portion 212 (i.e., the surface area of the exposed inner portion 224 that is not in contact with the adhesive 216) to an inner perimeter 232 of the adhesive 216 increases proportionally to a radius of the hat portion 212. For example, increasing the surface area of the inner portion 224 results in a smaller relative increase in the perimeter 232 of the adhesive 216. Accordingly, a lower burst pressure can be achieved by increasing the diameter of the hat portion 212 (and therefore the diameter of the inner portion 224) because the perimeter 232 of the adhesive 216 does not increase at the same rate, and therefore will fail at a lower pressure. In other words, the ratio of the inner surface area of the exposed inner portion 224 that is not in contact with the adhesive 216 to the inner perimeter 232 of the adhesive 216 determines the burst pressure. In other implementations, the burst pressure can be controlled by varying the strength and/or type of the adhesive 216 without changing the size of the opening 208 and/or the diameter of the inner portion 224.

Figure 4:
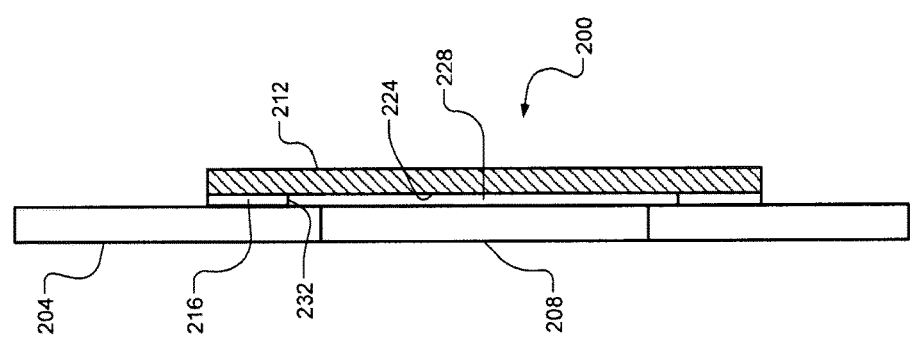
FIG. 4 illustrates another example pressure relief device according to the principles of the present disclosure.

Referring now to FIG. 4, the pressure relief device 200 may be implemented with a substantially flat hat portion 212 and the adhesive 216. In other words, the pressure relief device 200 as shown in FIG. 4 does not include a recessed inner portion 224 and/or an outer ring portion 220 as shown in FIG. 3. Instead, the inner portion 224 of the hat portion 212 is substantially flat and equidistant from the opening 208 and the battery pack 204. However, the presence of the adhesive 216 applied only to outer portions of the hat portion 212 form the gap 228 between the opening 208 and the inner portion 224. Accordingly, the portion of the hat portion 212 exposed to the venting gases can still be controlled to be greater than the diameter of the opening 208. In other words, only the diameter of the gap 228 must be greater than the diameter of the opening 208 to allow a greater amount of the gases to contact the inner portion 224, and the width of the gap 228 is not significant.

Figure 5:
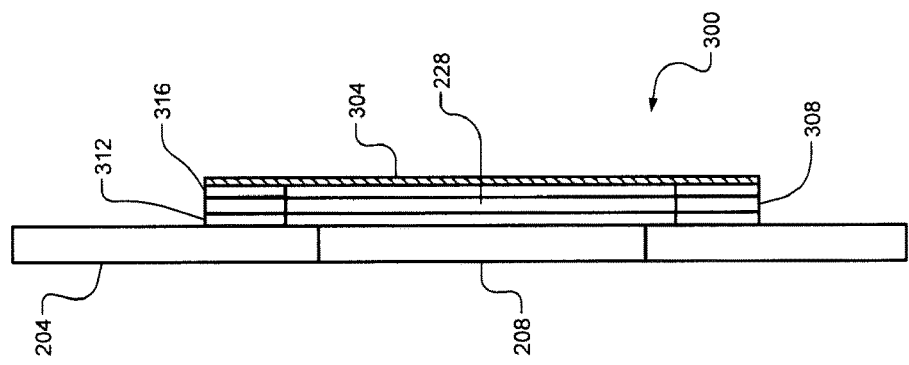
FIG. 5 illustrates still another example pressure relief device according to the principles of the present disclosure.

Referring now to FIG. 5, another example pressure relief device 300 includes a hat portion 304, an intermediary portion 308, a first layer of adhesive 312, and a second layer of adhesive 316. The intermediary portion 308 is more pliable relative to the hat portion 304. For example only, the intermediary portion 308 comprises closed-cell foam or another suitable material. Accordingly, the intermediary portion 308 conforms to any surface irregularities in the battery pack 204 and achieves more consistent contact with the battery pack 204 via the adhesive 312. The hat portion 304 is attached to the intermediary portion 308 via the adhesive 316. Either one or both of the adhesives 312 and 316 may be selected to fail at the burst pressure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A pressure relief device attached to an outer surface of a battery pack, the pressure relief device comprising:
    an adhesive arranged around an opening in the outer surface of the battery pack, the outer surface defining a plane; and
    a hat portion arranged over the opening, the hat portion comprising:
        an outer ring portion attached to the outer surface of the battery pack via the adhesive; and
        an inner portion that is spaced apart from the plane so as to form a gap between the outer surface and the inner portion,
    wherein a diameter of the inner portion along the plane is greater than a diameter of the opening.

2. The pressure relief device of claim 1, wherein the outer ring portion is in direct contact with the adhesive.

3. The pressure relief device of claim 1, wherein the inner portion is concave.

4. The pressure relief device of claim 1, wherein the diameter of the inner portion is determined based on a desired burst pressure of the pressure relief device.

5. The pressure relief device of claim 4, wherein the desired burst pressure of the pressure relief device is associated with the diameter of the opening at a desired flow rate through the opening.

6. The pressure relief device of claim 1, further comprising an intermediary portion arranged between the hat portion and the adhesive.

7. A battery pack, comprising:
an opening in an outer surface of the battery pack, the outer surface defining a plane; and
a pressure relief device attached to the outer surface of the battery pack, the pressure relief device comprising:
an adhesive arranged around the opening;
an outer ring portion attached to the outer surface of the battery pack via the adhesive; and
an inner portion that is spaced apart from the outer surface of the battery pack so as to form a gap between the outer surface and the inner portion,
wherein a diameter of the inner portion along the plane is greater than a diameter of the opening.

8. The battery pack of claim 7, wherein the outer ring portion is in direct contact with the adhesive.

9. The battery pack of claim 7, wherein the inner portion is concave.

10. The battery pack of claim 7, wherein the diameter of the inner portion is determined based on a desired burst pressure of the pressure relief device.

11. The battery pack of claim 7, wherein the desired burst pressure is associated with the diameter of the opening at a desired flow rate through the opening.

12. The battery pack of claim 7, further comprising an intermediary portion arranged between the hat portion and the adhesive.

13. The pressure relief device of claim 1, wherein the gap is filled with at least one gas.

14. The pressure relief device of claim 13, wherein the opening is filled with the at least one gas, and a first pressure of the at least one gas in the gap is equal to a second pressure of the at least one gas in the opening.

15. The pressure relief device of claim 1, wherein the hat portion is formed of a rigid material.

16. The battery pack of claim 7, wherein the gap is filled with at least one gas.

17. The battery pack of claim 16, wherein the opening is filled with the at least one gas, and a first pressure of the at least one gas in the gap is equal to a second pressure of the at least one gas in the opening.

18. The battery pack of claim 7, wherein the hat portion is formed of a rigid material.

* * * * *